3,550,418
RACK GEAR FORMATION
Cannell J. McLeod, 66 Shepherd Ave.,
East Braintree, Mass. 02184
Continuation of application Ser. No. 540,588, Apr. 6,
1966. This application June 10, 1969, Ser. No. 834,218
Int. Cl. B21d 53/00; B21h 7/00; B21k 1/00
U.S. Cl. 72—192                           7 Claims

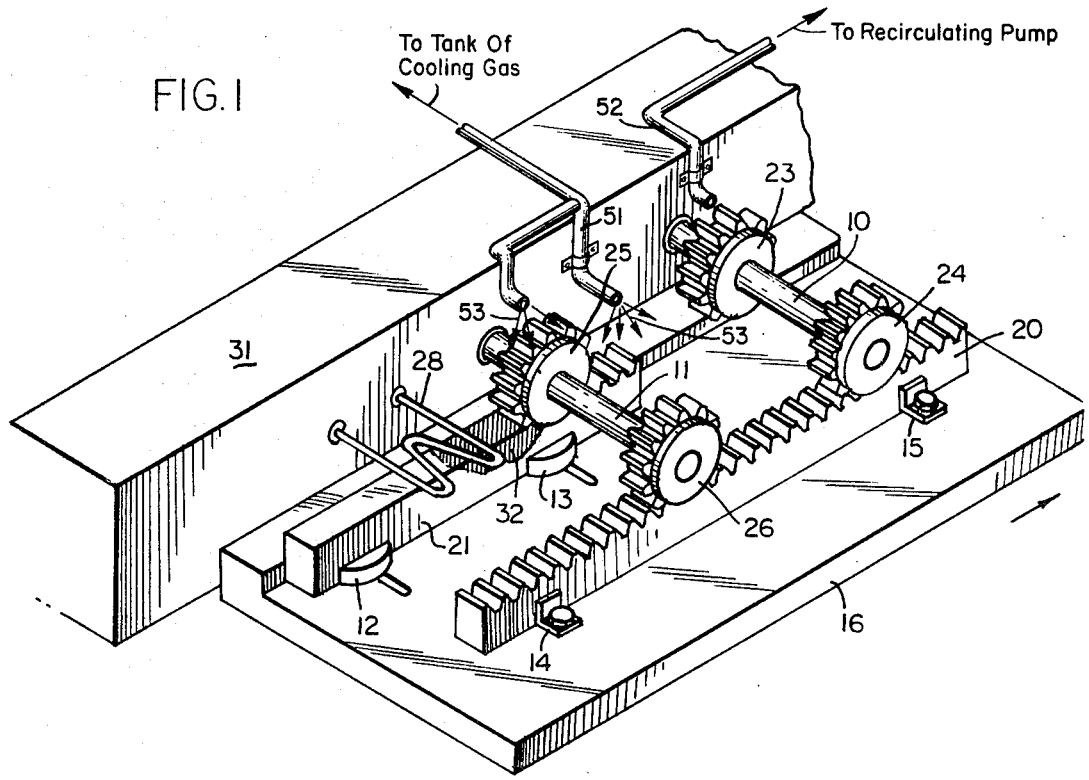
FIG. 1
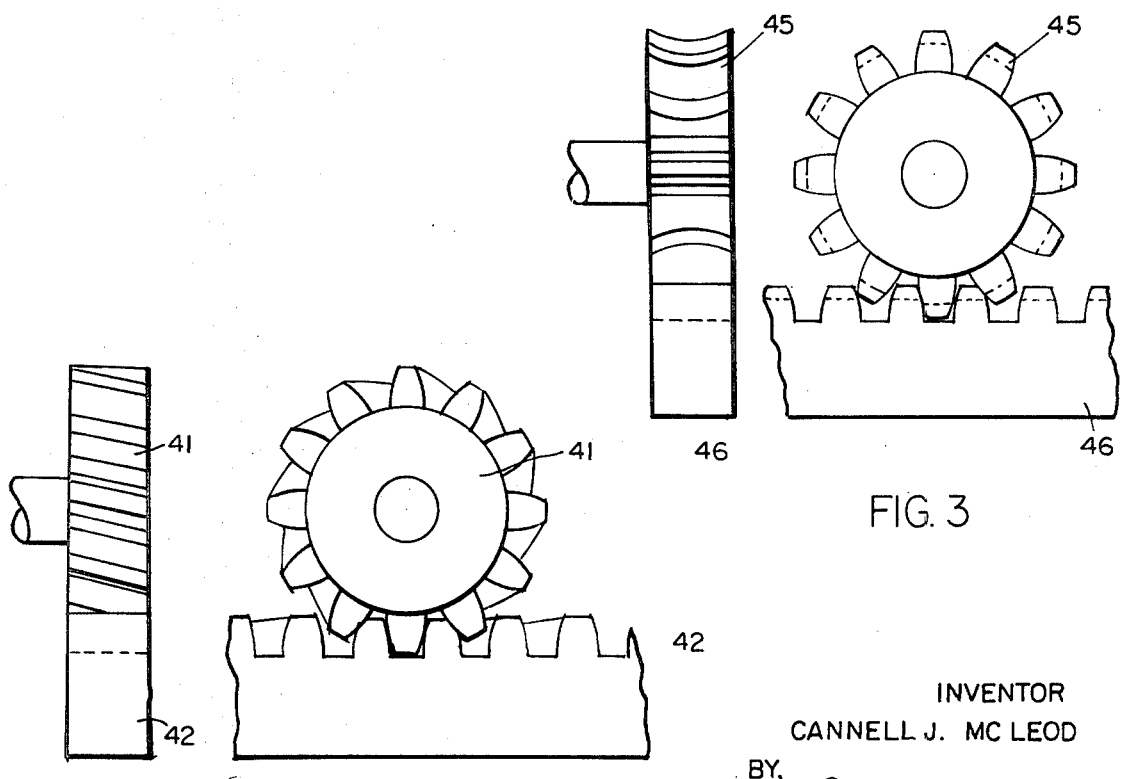
FIG. 2
FIG. 3
INVENTOR
CANNELL J. MC LEOD
BY,
Richard F. Benway
ATTORNEY United States Patent Office 3,550,418
Patented Dec. 29, 1970

ABSTRACT OF THE DISCLOSURE

Rack forming for precision machine use, which includes heating a portion of a workpiece to a limited depth and temperature hot forming 90% of the final tooth configuration, followed by cold working the remaining 10% of final tooth configuration. Tooth-to-tooth registration is controlled by a master rack.

This application is a continuation of Ser. No. 540,588, filed Apr. 6, 1966, and now abandoned.

This invention relates to rack gears and more particularly to a novel way of fabricating rack gears.

Gear tooth forming is one of the most important engineering processes of present day practice. Gears with cast teeth from sand molds, permanent molds or metal dies are extensively used at the present time at comparatively slow speed operations. Practically all watches and clock gears are stamped from sheet metal and give excellent results for the duty they must perform in those applications. Plastic mold material is also used to some extent. Gearing, however, for precise operations or for installations for high speed where heavy loads prevail, is usually made with cut teeth which are often finished by various processes to obtain high accuracy and comparatively noiseless operation.

Cutting gear teeth by using a formed type cutter is still an important and extensively used process. However, mass production of spur gear teeth with formed cutters requires an automatic process and a very involved machining setup. In fact, two cutters are usually used. One cutter shapes the teeth and the second cutter finishes the teeth. After the teeth have been so formed, they quite frequently have to be heat treated, that is, hardened, and later they have to be finished by burnishing, shaving, lapping or even grinding.

Gears with teeth of almost any form can be used to generate conjugate teeth in a plastic blank by rolling the master gear and the blank together at the proper speed ratio equal to the ratio of the pitch diameters. This principle is used in producing hot rolled gears from which a master gear is rolled with a heated gear blank. Good results have been obtained in this process although it is not extensively used at the moment. Involute teeth will generate conjugate teeth of integral form, in the application of this principle. Therefore, involute gears will produce conjugate teeth in a rack also.

Hot formed toothed bars have been produced in the prior art. These tooth bars were made up of high carbon steel and were used for such things as jack posts or other similar pulling or pushing devices. Furthermore, the tooth bar was not properly a gear for it worked with a ratchet and pawl arrangement.

The prior art, then, with respect to rack gears, has been confined to the use of cut rack teeth. Cutting teeth on a rack for gear purposes requires elaborate machinery. Furthermore, the rack teeth once formed by cutters must be finished, cleaned, and the rack straightened out, then tempered and their surfaces lapped or treated so that they will have sufficient wearability for use as gears. Rack gear teeth are almost exclusively made in a spur formation, that is, the teeth are straight and normal to the side surfaces. Not only then will the present invention obviate the need for elaborate equipment that the prior art systems of gear production with respect to racks, but the gear teeth will be made simpler and structurally sounder (that is, improved mechanical properties as hardness, tensile strength, yield strength, fatigue resistance, and shock resistance), without the need for additional steps and additional equipment. The present invention contemplates an automatic machine which will hot form rack teeth and cold work the hot formed teeth immediately following the step of formation with the consequent result that a stronger, sturdier gear rack will be produced. Furthermore, the rack can be made in not only a spur teeth configuration, but also in a helical gear formation and in a worm wheel gear formation.

Therefore, an object of this invention is to provide a novel means for producing rack gears.

Another object of this invention is to provide means for producing a rack having configurations unobtainable in the prior art.

Another object of this invention is to provide means for producing rack gears more efficiently and economically than has heretofore been possible.

Another object of this invention is to provide method and means of producing rack gears which are sturdier, more durable with improved mechanical characteristics.

Further objects and advantages of the present invention will become apparent in the reading of the following specifications when read in conjunction with the attached drawings on which: FIG. 1 is an illustration of a basic embodiment of this invention; FIG. 2 shows an alternative (helical) gear formation; FIG. 3 shows another alternative gear formation which is that of a worm gear.

The materials to be used for rack formation can be nonresulfinized or nonleaded steel, such as SAE 1020, 1040, 1050 which are capable of hot and cold formability. Forge quality brasses can be used when a brass or non-steel rack is desired. These materials, when used in the present invention, will provide better properties than the currently used free machining and resulfinized and leaded steels with the added advantage of grain refinement and reorientation.

After a rack material has been selected, a rectangular section of stock would be placed on bed 16 in FIG. 1 and is shown as workpiece 21. Stock 21 is securely fastened to bed 16 by means of clamps 12 and 13. It will be noted that a rack similar in ultimate design of the rack that will be produced by this machine is shown as master rack 20. It too is clamped in place by means of clamps 14 and 15 on bed 16. An electric coil for induction heating 28 is shown. As rack material 21 passes under the coil, it is heated by means of eddy currents induced in its surface by means of the induction coil 28, thereby heating the top surface to preselected depth 32.

The depth to which the heating of the bar stock is to be accomplished is a function of the depth of the tooth that will ultimately be formed on the bar. The depth could be determined by considering the width of the face of the teeth to be formed. The pitch of the teeth is also the height of the teeth. It is desirable to provide a depth which is somewhat larger than the tooth dedendum or section that goes below the pitch line because when the material is formed, chilling resulting from the pressure of the former will cause strains that would not be desirable. The time it takes the gear or the rack to pass under coil 28 and the depth to which plastic heating is attained has to be determined for each and every rack gear desired. However, the means by which this is accomplished is well known in the art and obtainable in a standard induction and heating handbook.

As the rack to be formed is heated to a plastic state and is passing under the hot former, the predetermined solid pitch line will be indented as to produce the dedendum and the excess stock caused by the depression will rise and form the addendum, the amount of metal displaced will find its equilibrium as this axial elongation is taking place, there will be a tendency for the material to have a side mushrooming effect at this direct point under the center of the hot former to control this side effect. Either rollers or small tapered degree guides not shown attached to the hot former fixture will control this condition and so arranged as to press against the workpiece immediately below the hot former. The excess material can also be ground off after the rack has cooled. In most cases a slight bulge will be of no consequence and no provisions will be required for its control.

The base 16 is hydraulically driven although other means are suitable. Once workpiece 21 is secured to base 16, and the induction coil 28 is turned on, the piece will travel in the direction indicated by the arrow. Hot former 25 being rigidly affixed to a shaft 11 will rotate in accordance with the same motion that gear 26 rotates which is also rigidly affixed to shaft 11. It is obvious then that hot former 25 cannot become misaligned or get out of synchronism with gear 26. Hot former 25 cannot penetrate to any greater depth than would be required owing to its alignment with rack 20 and gear 26. Therefore, speed, temperature and pressure of hot former 25 is dictated to and controlled completely by gear 26 in its engagement with rack 20. In this case, rack 20 is called the master rack.

Workpiece 21 should have been heated beyond the critical temperature of the material involved so that when hot former 25 presses into the material, it does not chill the material such that the material drops below its plastic phase and thereby creates unequal strains within the material. But owing to the arrangement of master rack 20, gear 26 and common shaft 11 of hot former 25 and gear 26, the temperature required is not fixed in the upper direction provided; however, the critical temperature is exceeded yet the temperature where the material becomes liquid is not exceeded.

Electric heating minimized oxidization of the material. Induction heating will heat the material to a plastic state yet will not cause oxidization of the surface; therefore, as the workpiece 21 passes under hot former 26, little oxide and no scale will be evident.

After the teeth have been impressed in workpice 21, the piece continues on and passes under a second cold former 23 which is also mounted on a common shaft with a gear 24 that engages rack 20. It is obvious here then that the gear team will be perfectly aligned with the former gear team produced by hot former 25. The present scheme of having a master rack and a guiding gear 24 permits and controls the spacing of gear teeth, their alignment, and also the pressure that can be brought to bear on the workpiece. Thus, the cold former 23 completes the job of forming the teeth (also burnishing and finishing the teeth), that was started by hot former 25.

The hot former 25 should be permitted to produce only 90% of the gear teeth that is ultimately to be formed. Owing to the elevated temperature and the fact that the steel will shrink when it is cooled and, further, that a second operation of cold forming is required, the material should be prevented from having more than 90% of its teeth formed in this first step.

Both the hot former and the cold former are constructed of heat resistant steel or refractory metal, e.g., hot forming tool steels or Carborundum. Carborundum is able to withstand high temperatures yet retain its sharp edges. The sharp edges of the Carborundum naturally are required so that when the rack is impressed with the teeth from the former, clean cut edges will result.

As workpiece 21 passes from under hot former 25 and approaches cold former 23, the material should have cooled considerably, that is, it should be at a temperature somewhat below critical temperature. If it is below critical temperature, cold working can be accomplished by means of cold former 23. If it is not below this temperature, some means will have to be provided for cooling the workpiece. A jet of air would be a proper cooling means, but to avoid contaminating the surface, a jet of refrigerated exothermic gas at a 70 to 90 dewpoint can be provided. However, in most instances where the speed will be somewhat slower to permit hot forming of the gear with adequate heating of the rack, nothing will be required (other than the slow speed) to cool workpiece 21 after the teeth have been formed in the material when it reaches cold former 23.

It should be noted that the master rack should engage both gears 26 and 24 at all times. For that matter, if additional hot or cold working stages are desired, all the gears controlling each stage should be engaged at all times. This procedure prevents the teeth from getting out of alignment. When the teeth have passed under the hot former and reach the cold former, the cold former will mesh with the partially formed teeth with ease without causing any distortion of the formed teeth.

Some means 51 of cooling may also be required for hot former 25 to prevent heat cracking, wear and distortion at elevated temperatures. However, carbide formers retain their definition at elevated temperatures for long periods of time. Nevertheless, if a long workpiece is required or rapid production of workpieces are required, then perhaps some means of cooling hot former will be needed. Again, this can be provided by a simple jet of air 53. The cooling can also be provided by a refrigerated noncombustible atmosphere which in turn will envelop the workpiece further limiting oxide from forming on the workpiece surface. Cooling means 51 would be connected to a tank of the appropriate cooling gas.

Cold working of the workpiece 21 may need some assistance. Pure graphite or silicon is quite adequate to aid cold working. Some means 52 can be provided to introduce powdered graphite and silicon between cold working tool 23 and workpiece 21. The graphite and silicon material may be mixed with mineral oil and powdered glass to provide some assistance to the cold working. Of course, this type of lubricating is necessary at this time because the workpiece will still have an elevated temperature although it will be somewhat below critical (forging) temperature which is necessary for cold working. Lubricating means 52 should be the well known use of a recirculating pump when the materials are mixed with mineral oil in order to conserve lubricant.

Referring to FIG. 2, a helical gear 41 is shown as it presses teeth in its counterpart, workpiece 42. The helical gear, like the spur gear, will form the teeth to the required depth and thickness and proper pitch. A guiding spur gear 26 and 24 may be used and only one hot forming tool 41 in place of 25 and a second cold forming tool identical to cold forming tool 41 in place of 23 will be required. However, it is suggested that a master rack having helical teeth thread and two helical guiding gears be used for this obviates any backlash or other difficulty that may be experienced by using spur gears in combination with helical teeth formation. There is no better way of gauging the depth of teeth, in controlling speed of turning the former than by having it on a common shaft with a gear that is mating with a master rack identical to the rack being formed.

Referring to FIG. 3, a new gear 45 is shown in a workpiece 46. A new gear 45 is actually a worm wheel. The worm wheel will cause an identical or conjugate impression to be made in the rack 46, such that a worm will be able to drive the rack just as a worm has been able to drive an ordinary worm wheel such as shown in 45. In order to produce sloping sides in the worm rack, the worm wheel must have sides sloping out instead of in. This is easily done in practice when the wheel is made.

The latter two racks described above as the present invention contemplates being able to produce have hitherto not been produced in the prior art. The reason for the inability to produce such racks is the requirement for having specialized tools and specialized gauging to accomplish these teeth. The possibility that the teeth will not line up with one another at some future point is so great that it is not attempted in industry.

A rack that has a worm wheel thread in it can be useful on such things as large bearing pedestals that require adjustment that only a small powerful worm can produce.

It is obvious from the foregoing that prior art machinery is very elaborate and very difficult to adjust. The present invention is very simple in construction, has very few active parts, is rugged, and very unlikely to lose its adjustment.

Although I have described my invention with regard to particular apparatus, it is to be clearly understood that those skilled in the art may make substitutions and alterations without departing from the true scope of my invention. What I wish to be considered as my invention is that which I have claimed in the appended claims.

What I claim is:

1. The method of forming rack teeth comprising the steps of:
   selecting a piece of rack forming stock having preselected forging characteristics,
   affixing said stock to a slideable worktable,
   sliding said worktable in a horizontal direction,
   passing said workpiece under an electric induction heater and heating preselected portions of said workpiece to a predetermined depth to a plastic state for receiving rack teeth formations,
   pressing said plastic portions of said workpiece into a carbide hot former of preselected tooth configuration and at a predetermined rate and hot forming approximately 90% of the ultimate tooth configuration,
   pressing immediately after said hot forming, the partially formed tooth bar into a carbide cold former of identical tooth configuration as said hot former and at a predetermined rate and cold forming the remaining approximately 10% of the ultimate tooth configuration, and
   controlling the rotation of said hot and cold formers by maintaining said formers in synchronous rotation whereby the partially hot-formed rack teeth register perfectly with the cold former teeth which subsequently finish form said rack teeth.

2. The method of forming rack teeth according to claim 1, which further includes the step of lubricating said formed tooth prior to cold working.

3. The method of forming rack teeth according to claim 2, wherein said preselected work piece is selected from the group consisting of nonresulfinized nonleaded steel such as SAE 1020, SAE 1040, SAE 1050 and forge quality brass.

4. The method of forming rack teeth according to claim 3, which further includes the step of cooling said hot former.

5. The method of forming rack teeth according to claim 4 wherein said hot former has a spur gear configuration.

6. The method of forming rack teeth according to claim 4 wherein said hot former has a helical gear configuration.

7. The method of forming rack teeth according to claim 4 wherein said hot former has a worm wheel configuration.

References Cited

UNITED STATES PATENTS

| | | | |
|---|---|---|---|
| 1,558,086 | 10/1925 | Gustavsen | 29—159.2 |
| 1,619,997 | 3/1927 | White | 72—192 |
| 2,464,658 | 3/1949 | Stivin | 219—7.5 |
| 2,922,014 | 1/1960 | Green | 219—7.5 |
| 2,930,877 | 3/1960 | Pelphrey | 29—159.2 |
| 3,121,352 | 2/1964 | McCardell | 29—159.2 |
| 3,261,192 | 7/1966 | Saito et al. | 29—159.2 |

CHARLES W. LANHAM, Primary Examiner

E. M. COMBS, Assistant Examiner

U.S. Cl. X.R.

29—159.2; 72—342, 364, 449